(12) United States Patent
Kato et al.

(10) Patent No.: US 6,338,017 B1
(45) Date of Patent: Jan. 8, 2002

(54) BRAKE FORCE DISTRIBUTION CONTROL DEVICE FOR AUTOMOTIVE VEHICLES

(75) Inventors: Toshihisa Kato, Anjo; Kenji Tozu, Yokkaichi; Satoshi Yokoyama, Nishio; Masanobu Fukami, Aichi-ken; Shinsuke Sakane, Handi, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/580,433

(22) Filed: May 30, 2000

(30) Foreign Application Priority Data

May 28, 1999 (JP) .......................................... 11-149796

(51) Int. Cl.⁷ ................................................ B60T 8/34
(52) U.S. Cl. ............................ 701/79; 701/70; 303/186
(58) Field of Search ............................. 701/70, 78, 79; 303/167, 183, 186, 187, 188

(56) References Cited

U.S. PATENT DOCUMENTS

| | | | | |
|---|---|---|---|---|
| 5,641,209 A | * | 6/1997 | Kushi et al. ............... | 303/9.71 |
| 5,691,900 A | * | 11/1997 | Luckevich ............ | 364/424.051 |
| 5,842,755 A | * | 12/1998 | Sugimoto et al. ............ | 303/186 |
| 5,887,957 A | * | 3/1999 | Buttner et al. ............... | 303/186 |
| 5,938,299 A | * | 8/1999 | Hara et al. .................. | 303/186 |
| 6,238,018 B1 | * | 5/2001 | Sugimoto et al. ............ | 303/146 |

FOREIGN PATENT DOCUMENTS

| JP | 9-11878 | | 1/1997 |
|---|---|---|---|
| JP | 95087 | * | 4/2000 |

* cited by examiner

*Primary Examiner*—Michael J. Zanelli

(57) ABSTRACT

A braking force distribution control device for an automotive vehicle is designed to make it possible to initiate a braking force distribution control as rapidly as possible upon rapid braking operation while at the same time being capable of preventing a malfunction of the braking force distribution control even when one of hydraulic pressure lines fails. The braking force distribution control establishes a predetermined relationship between the wheel cylinder pressure of a front wheel and a wheel cylinder pressure of a rear wheel on the basis of a comparison between the wheel speeds of the front and rear wheels. The braking force distribution control is initiated when the decelerations of all the wheels exceed a set value.

10 Claims, 8 Drawing Sheets

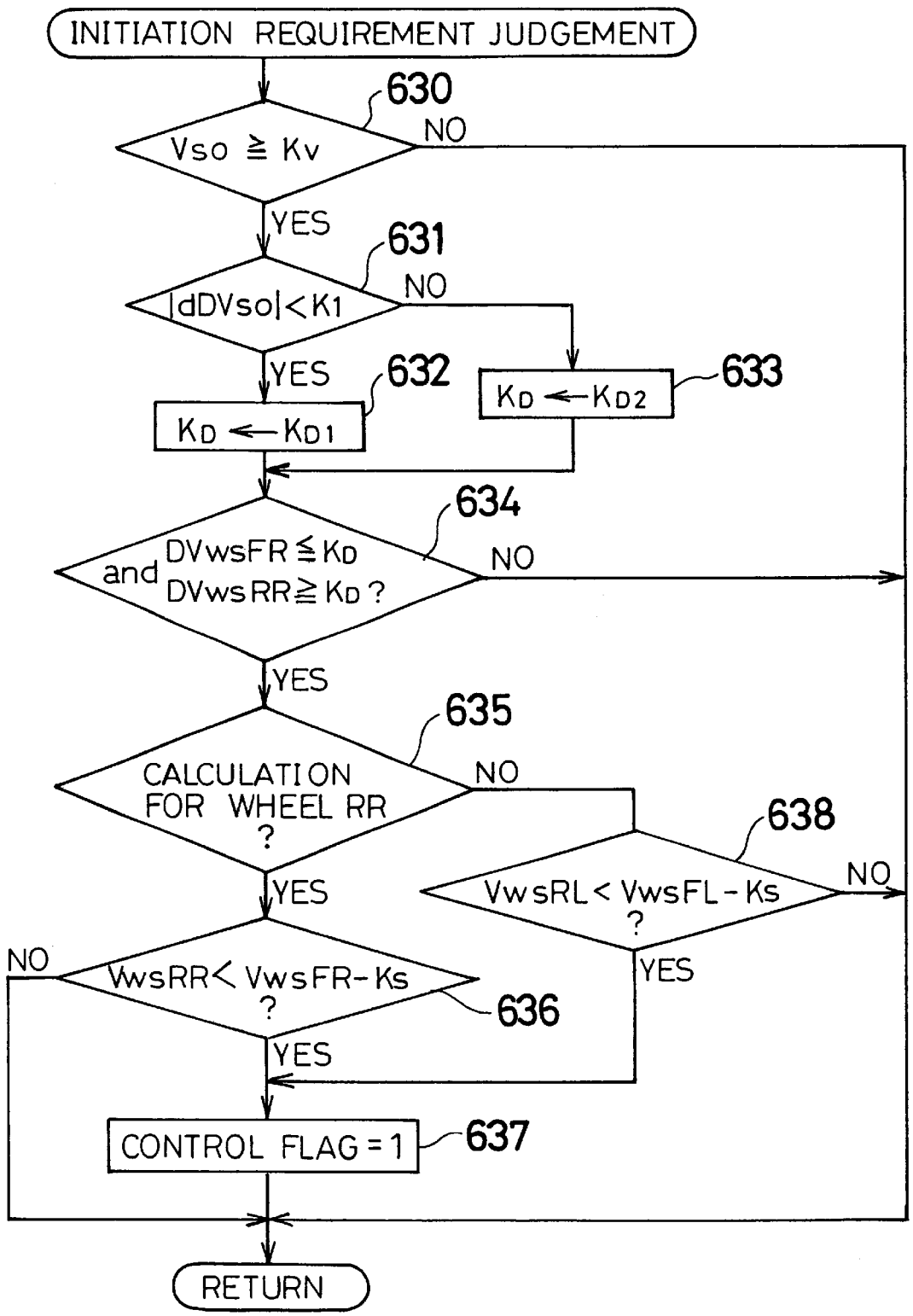

BRAKE FORCE DISTRIBUTION CONTROL DEVICE FOR AUTOMOTIVE VEHICLES

This application is based on and claims priority under 35 U.S.C. § 119 with respect to Japanese Application No. 11(1999)-149796 filed on May 28, 1999, the entire content of which is incorporated herein by reference.

FIELD OF THE INVENTION

The present invention is generally directed to a vehicle braking system. More particularly, the present invention pertains to a braking force distribution control device in which a predetermined relationship is established between the braking force of the rear wheel and the braking force of the front wheel.

BACKGROUND OF THE INVENTION

Japanese Unexamined Patent Publication No. Hei. 9-11878, published in 1997, discloses a braking force distribution control device that is designed to execute a braking force distribution control in the vehicle longitudinal direction. The braking force distribution control is made on the basis of the difference between the speed of a front wheel and the speed of a rear wheel, and is initiated when the vehicle body deceleration is in excess of a set value or a vehicle body reference deceleration. More specifically, the braking force distribution control is initiated upon the occurrence of one of the following.

1) When the vehicle body deceleration exceeds a first set value and the wheel speed differential between the front wheel and the rear wheel deviates from a set value.
2) Despite a wheel speed differential, when the vehicle body deceleration exceeds a second set value which is greater than the first set value.

In this known braking force distribution control device, the braking force distribution control is initiated when the vehicle deceleration exceeds the set value. This makes it possible to initiate the control rapidly when a rapid operation of a brake pedal or a rapid braking operation is performed in which the change of the wheel speed differential is slow due to gradual load shift of the vehicle body, as compared with a similar device which is designed to initiate the control based on only the wheel speed differential between the rear and front wheels.

However, because the rapid braking operation causes the vehicle body deceleration to increase after the increase of the wheel deceleration, the initiation of the braking force distribution control in this known device is delayed.

In addition, in general, a dual brake circuit system such as an X-piping system or a longitudinal piping system is employed in automotive vehicles. If one of hydraulic pressure lines fails, it is possible that the vehicle body deceleration exceeds the set value, which may unexpectedly initiate the braking force distribution control, thereby lowering the braking force applied to the vehicle.

In light of the aforementioned drawbacks, a need exists for a braking force distribution control device for automotive vehicles which is capable of initiating a braking force distribution control as quickly as possible upon rapid braking operation.

A need also exists for a braking force distribution control device for automotive vehicles which prevents initiation of the braking force distribution control when one of hydraulic pressure lines fails.

SUMMARY OF THE INVENTION

According to one aspect of the present invention, a braking force distribution control device for an automotive vehicle having a plurality of wheels includes wheel speed detecting means for detecting a wheel speed of each of the plurality of wheels, wheel deceleration calculating means for calculating a wheel deceleration of each of the plurality of wheels based on the detecting results of the wheel speed detecting means, and braking control means for controlling a braking force of a rear wheel to execute a braking force distribution control in such a manner that the braking force of the rear wheel is adjusted to have a predetermined relationship to the braking force of a front wheel depending on a comparison between the wheel speed of the front wheel and the wheel speed of the rear wheel based on the detecting results of the wheel speed detecting means, the braking control means initiating the braking force distribution control when at least one of the wheel decelerations of the plurality of wheels exceeds a set value.

The braking force distribution control is initiated when at least one of the decelerations of the wheels exceeds a set value, which makes it possible to initiate the braking force distribution control more rapidly upon the occurrence of a rapid braking operation when compared.

The braking force distribution control device can also include a first wheel cylinder applying a braking force to a first wheel of the plurality of the wheels and connected to a first hydraulic pressure line and a second wheel cylinder applying a braking force to a second wheel of the plurality of the wheels and connected to a second hydraulic pressure line which is disconnected from the first hydraulic pressure line. The braking control means initiates the braking force distribution control when both of the decelerations of the first and second wheels exceed the set value. Thus, when one of the first and second hydraulic pressure lines fails, the deceleration of either the first wheel or the second wheel does not exceed the set value. This makes it possible to prevent an unexpected initiation of the braking force distribution control to thereby avoid the lowering of the braking force applied to the vehicle.

The braking control means can also be designed to initiate the braking force distribution control when the deceleration of a driving wheel exceeds the set value. In the event both the acceleration and brake pedals are depressed concurrently the deceleration of the driving wheel does not exceed the set value, thus preventing an unexpected initiation of the braking force distribution control and avoiding the lowering of the braking force applied to the vehicle.

The braking control means can also be designed to initiate the braking force distribution control when the decelerations of all of the wheels exceed the set value. The braking force distribution device can further include a hydraulic pressure generator for generating a hydraulic pressure, wheel cylinders mounted on the front and rear wheels for applying braking forces to the respective wheels, a hydraulic pressure line connecting the hydraulic pressure generator and each of the front and rear wheel cylinders, and a hydraulic pressure control valve disposed in the hydraulic pressure line for regulating the hydraulic pressure applied to the corresponding wheel cylinder. The braking control means then controls the hydraulic pressure control valve of the rear wheel for adjusting the hydraulic pressure of the wheel cylinder of the rear wheel to establish a predetermined relationship between the wheel cylinder pressure of the front wheel and the wheel cylinder pressure of the rear wheel.

According to another aspect of the invention, a braking force distribution control device for an automotive vehicle having a plurality of wheels that includes a pair of front wheels and a pair of rear wheels, comprising:

a pressure generator for generating hydraulic pressure;

a plurality of wheel cylinders each mounted on one of the wheels and connected to the pressure generator for applying a braking force to each of the plurality of wheels;

a plurality of wheel speed sensors each operatively associated with one of the wheels for detecting a wheel speed of each wheel;

means for calculating a wheel deceleration of each of the plurality of wheels based on the wheel speeds detected by the wheel speed sensors; and a controller which initiates braking force distribution control when at least one of the wheel decelerations of the plurality of wheels exceeds a set value so that the braking force applied to one rear wheel is adjusted to have a predetermined relationship to a braking force applied to one front wheel depending upon a comparison of the wheel speed of the one front wheel and the wheel speed of the one rear wheel as detected by the wheel speed sensors.

BRIEF DESCRIPTION OF THE DRAWINGS

Additional features and characteristics of the present invention will become more apparent from the following detailed description considered with reference to the accompanying drawing figures in which like elements are designated by like reference numerals and wherein:

FIG. 8 is an alternative to the flow chart shown in FIG. 6 for initiation condition judgment.

DETAILED DESCRIPTION OF THE PRESENT INVENTION

Figure 1:
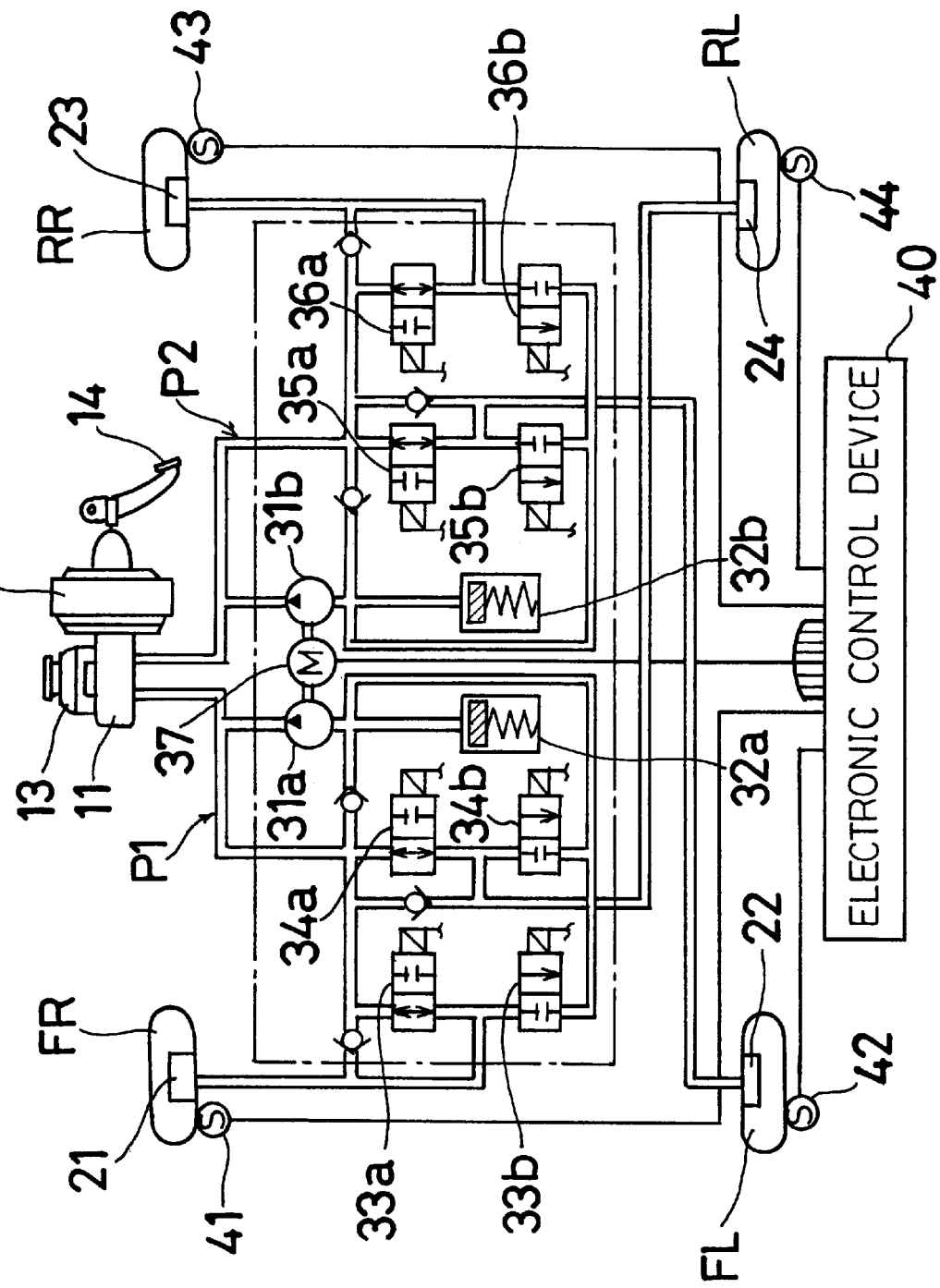
FIG. 1 is a schematic diagram of a braking force distribution control device for an automotive vehicle in accordance with the present invention.

Referring initially to FIG. 1, the braking force distribution control device for an automotive vehicle in accordance with the present invention includes a front-right wheel FR, a front-left wheel FL, a rear-right wheel RR, and a rear-left wheel RL, each of which is mounted on an automotive vehicle and provided with a respective wheel cylinder. Thus, the front-right wheel FR is provided with a wheel cylinder 21, the front-left wheel FL is provided with a wheel cylinder 22, the rear-right wheel RR is provided with a wheel cylinder 23, and the rear-left wheel RL is provided with a wheel cylinder 24. The wheel cylinders 21, 24 for the respective wheels FR, RL are in fluid communication with one of the pressure chambers of a tandem master cylinder 11 by way of a first hydraulic pressure line P1, while the wheel cylinders 22, 23 for the respective wheels FL, RR are in fluid communication with the other pressure chamber of the tandem master cylinder 11 by way of a second hydraulic pressure line P2. The second hydraulic pressure line P2 and the first hydraulic pressure line P1 are fluidly separated and constitute a hydraulic system of the so-called diagonal piping type or X-piping type. Though the front wheels FR, FL are driving wheels and the rear wheels, RL RR are driven wheels according to the described embodiment, the invention is not restricted in this regard and another driving system can be employed.

The tandem master cylinder 11 is operatively connected, by way of a vacuum operated booster 12, to a brake pedal 14 and is in fluid communication with a master reservoir 13. When the brake pedal 14 is depressed, the resulting depressing force is transmitted to the tandem master cylinder 11 for activating the tandem master cylinder after being boosted by the booster 12. This causes brake fluid stored in the master reservoir 13 to increase, thereby outputting the brake fluid under pressure to each of the first hydraulic pressure line P1 and the second hydraulic pressure line P2.

In the first hydraulic pressure line P1, there are provided a pair of normally open 2-port/2-position type open/close electromagnetic valves 33a, 34a, a pair of normally closed 2-port/2-position type electromagnetic valves 33b, 34b, an auxiliary reservoir 32a, and a hydraulic pump 31a. One of the normally open open/close electromagnetic valves 33a is disposed between the tandem master cylinder 11 and the wheel cylinder 21, while the other normally open open/close electromagnetic valve 34a is disposed between the tandem master cylinder 11 and the wheel cylinder 24. One of the normally closed open/close electromagnetic valves 33b is disposed between the auxiliary reservoir 32a and the wheel cylinder 21, while the other normally closed open/close electromagnetic valve 34b is disposed between the auxiliary reservoir 32a and the wheel cylinder 24.

The auxiliary reservoir 32a, which is independent of the master reservoir 13, reserves an amount of brake fluid, acts as an accumulator, and is configured to include a piston and a spring. The hydraulic pump 31a is connected at its sucking port or drawing-in port to the auxiliary reservoir 32a. A discharge port of the hydraulic pressure pump 31a is connected to an intermediate portion between the tandem master cylinder 11 and the open/close electromagnetic valve 33a and an intermediate portion between the tandem master cylinder 11 and the open/close electromagnetic valve 34a. That is, the discharge port of the hydraulic pressure pump 31a is connected to the first hydraulic pressure line P1 at a point between the tandem master cylinder 11 and the open/close electromagnetic valve 33a, and at a point between the tandem master cylinder 11 and the open/close electromagnetic valve 34a. The hydraulic pressure pump 31a is driven by an electric motor 37, sucks or draws in the brake fluid stored in the auxiliary reservoir 32a, and discharges the resulting brake fluid after pressurization to the point intermediate between the tandem master cylinder 11 and the open/close electromagnetic valve 33a and intermediate between the tandem master cylinder 11 and the open/close electromagnetic valve 34a.

The second hydraulic pressure line P2 is also provided with a pair of normally open 2-port/2-position type open/close electromagnetic valves 35a, 36a, a pair of normally closed 2-port/2-position type electromagnetic valves 35b, 36b, an auxiliary reservoir 32b, and a hydraulic pump 31b. One of the normally open open/close electromagnetic valve 35a is disposed between the tandem master cylinder 11 and the wheel cylinder 22, while the other normally open open/close electromagnetic valve 36a is disposed between the tandem master cylinder 11 and the wheel cylinder 23. One of the normally closed open/close electromagnetic valve 35*b* is disposed between the auxiliary reservoir 32*b* and the wheel cylinder 22, while the other normally closed open/close electromagnetic valve 36*b* is disposed between the auxiliary reservoir 32*b* and the wheel cylinder 23. The auxiliary reservoir 32*b*, which is independent of the master reservoir 13, reserves an amount of brake fluid, acts as an accumulator, and possesses a piston and a spring. The hydraulic pump 31*b* is connected at its sucking or drawing-in port to the auxiliary reservoir 32*b*. The discharge port of the hydraulic pressure pump 31*b* is connected to an intermediate portion between the tandem master cylinder 11 and the open/close electromagnetic valve 35*a* and an intermediate portion between the tandem master cylinder 11 and the open/close electromagnetic valve 36*a*. That is, the discharge port of the hydraulic pressure pump 31*b* is connected to the second hydraulic pressure line P2 at a point between the tandem master cylinder 11 and the open/close electromagnetic valve 35*a* and at a point between the tandem master cylinder 11 and the open/close electromagnetic valve 36*a*. The hydraulic pressure pump 31*b*, which is set to be driven by the electric motor 37, sucks or draws in brake fluid stored in the auxiliary reservoir 32*b* and discharges the resulting brake fluid after pressurization to the point intermediate between the tandem master cylinder 11 and the open/close electromagnetic valve 35*a* and intermediate between the tandem master cylinder 11 and the open/close electromagnetic valve 36*a*.

The open/close electromagnetic valves 33*a*, 34*a*, 35*a*, 36*a* and the open/close electromagnetic valves 33*b*, 34*b*, 35*b*, 36*b* constitute a hydraulic pressure control valve device, by which the hydraulic pressure of one of the wheel cylinders 21, 22, 23, and 24 is decreased, maintained and increased independent of the other wheels.

The wheels FR, FL, RR, RL are provided with wheel speed sensors 41, 42, 43, 44, respectively, which are electrically connected to an electronic control device or controller 40. The electronic control device 40 is fed with pulse train signals from the wheel speed sensors 41, 42, 43, and 44. The number of pulses of each of the pulse train signals represents the current rotational number or wheel speed of the corresponding wheel.

Figure 2:
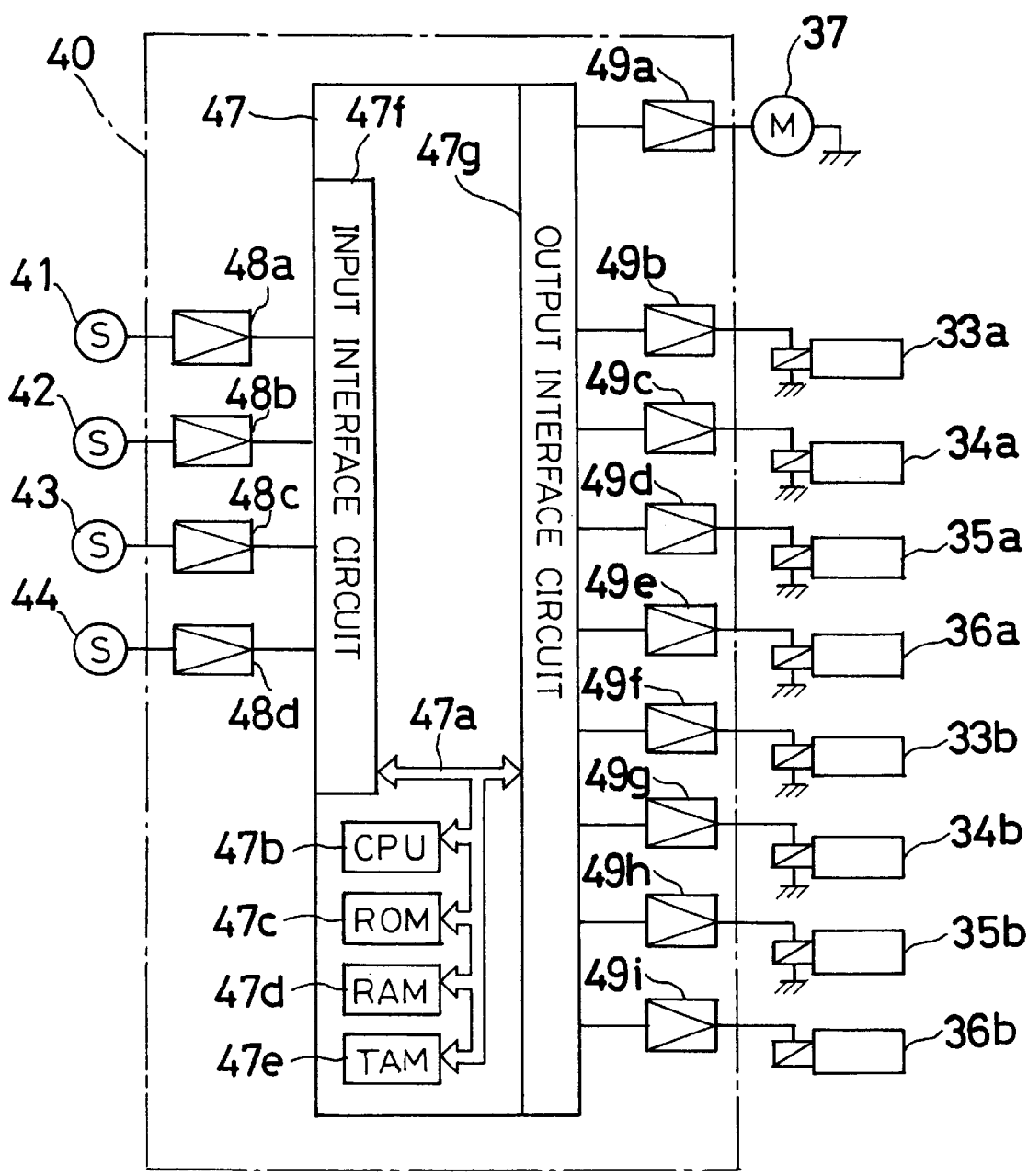
FIG. 2 is a block diagram of an electronic control device used in the braking force distribution control device shown in FIG. 1.

As best shown in FIG. 2, the electronic control device 40 includes a microprocessor 47 which is made up of a CPU 47*b*, a ROM 47*c*, a RAM 47*d*, an input interface circuit 47*g* and an output interface 47*g* which are mutually connected with each other by a bus 47*a*. Output signals issued from the wheel speed sensors 41, 42, 43, 44 are fed to the input interface circuit 47*f* of the CPU 47*b* by way of amplifier circuits 48*a*, 48*b*, 48*c*, 48*d*, respectively. From the output interface circuit 47*g* of the CPU 47*b*, control signals are issued to the electric motor 47, the valves 33*a*, 34*a*, 35*a*, 36*a*, and the valves 33*b*, 34*b*, 35*b*, 36*b* by way of driving circuits 49*a*, 49*b*, 49*c*, 49*d*, 49*e*, 49*f*, 49*g*, 49*h*, 49*i*.

The ROM 47*c* of the microprocessor 47 stores various programs, some of which operate according to the flow charts illustrated in FIGS. 3–6. The CPU 47*b* executes the programs while an ignition on switch is being closed. The RAM 47*d* temporally stores variables which are required for the execution of the programs.

The electric motor 37 and the open/close valves 33*a*, 34*a*, 35*a*, 36*a*, 33*b*, 34*b*, 35*b*, 36*b*, which are under the driving control of the electronic control device 40, establish an ABS control (anti-skid control) and a longitudinal braking force distribution control as will be described in more detail later.

The ABS control controls braking forces to the respective wheels when a brake pedal 14 is depressed to prevent a locked condition of each of the wheels. The longitudinal braking force distribution control is designed to bring the rear wheel braking force into a predetermined relationship with the front wheel braking force dependent m upon the difference between the front wheel speed and the rear wheel speed, which restricts the increasing slope of the braking force of the rear wheels, thereby preventing an earlier locked condition of each of the rear wheels.

Figure 3:
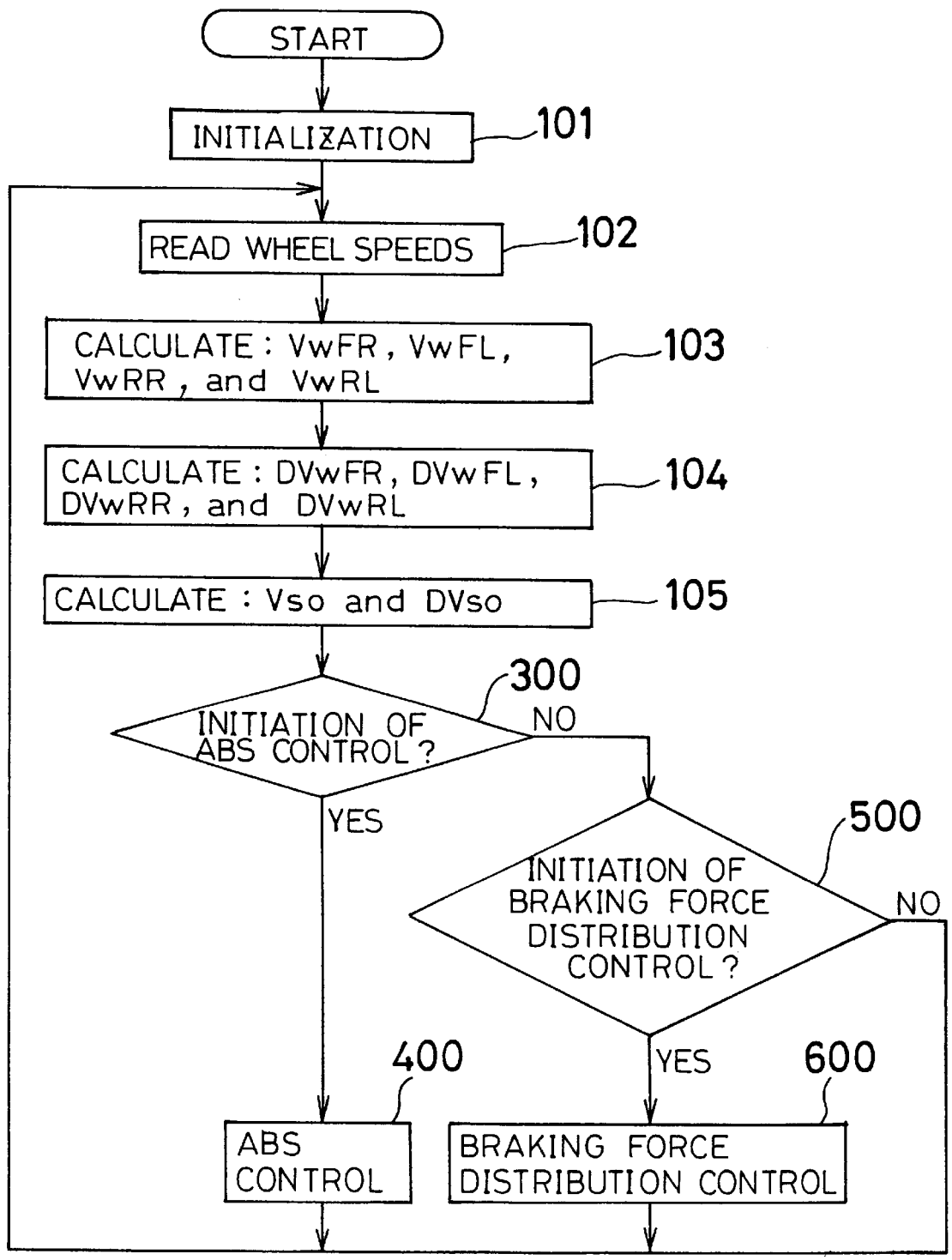
FIG. 3 is a flow chart of the overall control program for a vehicle brake operation in accordance with the present invention.

With the foregoing structure, if the ignition switch is turned on, the programs begin to run according to the flow charts shown in FIGS. 3–6. Referring to FIG. 3, which represents a main routine, at step 101 the microprocessor 40 is initialized so that various operational variables are cleared to zeros or set to predetermined values. Next, at step 102, the signals detected by the respective wheel speed sensors 41, 42, 43, 44 are read. Step 103 is then executed to calculate the wheel speeds VwFR, VwFL, VwRR, VwRL of the respective wheels FR, FL, RR, RL. At step 104, the wheel accelerations DVwFR, DVwFL, DVwRR, DVwRL of the respective wheels FR, FL, RR, RL are calculated by differentiating the wheel speeds VwFR, VwFL, VwRR, VwRL of the respective wheels FR, FL, RR, RL. At step 105, an estimated vehicle speed Vso at the center of gravity of the vehicle is calculated based the foregoing wheel speeds and a longitudinal vehicle acceleration DVso is calculated by differentiating the estimated vehicle speed Vso. As an alternative to such differentiation, a detected signal of a longitudinal acceleration sensor can be employed.

At step 300, it is determined whether or not the requirement(s) for initiating the ABS control is met. If the result is yes, at step 400 the program for ABS control is executed. If the result at step 300 is no, step 500 is executed for determining whether or not the requirement(s) for initiating the braking force distribution control is met. If the result is yes, at step 600 the program for the braking force distribution control is carried out. If the result at step 500 is no, the control goes back to step 102.

Referring to FIGS. 4–8, a detailed explanation is provided concerning how the braking force distribution control is carried out. Initially at step 601, various constants are set. Then, at step 602, on the basis of the wheel speeds VwFR, VwFL, VwRR, VwRL of the respective wheels FR, FL, RR, RL, reference speeds VwsFR, VwsFL, VwsRR, VwsRL of the respective wheels FR, FL, RR, RL are calculated. More specifically, with respect to the front-right wheel FR for example, the reference speed VwsFR is obtained from the following formula.

VwsFR=Max[wheel speed VwFR(n−1) of the latest calculation cycle −αdn·t, Min[wheel speed VwFR(n) of the current calculation, −wheel speed VwFR(n−1) of the latest calculation cycle +αup·t]];

where α up is the upper limit of the wheel speed increasing rate and is set to be, for example, 2 G (G: gravity acceleration), t is the number of calculation cycles, and α dn is the upper limit of the wheel speed decreasing rate and is set to be, for example, −1.15 G (G: gravity acceleration). Calculating such reference speeds VwsFR, VwsFL, VwsRR, VwsRL makes it possible to make the braking force distribution correct or reliable even though no correct wheel speeds can be determined due to bad road conditions or road disturbances such as a rough road surface or a stepped road surface.

At step 603, the reference wheel accelerations DVwsFR, DVwsFL, DVwsRR, DVwsRL are calculated by differentiating the reference speeds VwsFR, VwsFL, VwsRR, VwsRL, respectively. At step 604, a braking force distribution control calculation is then carried out for the front wheels FR, FL and the rear wheels RR, RL. Finally, at step 605, a braking force distribution control operation is then established in which the CPU 47 issues the driving signals to the open/close electromagnetic valves 35a, 35b, 36a, 36b and the electric motor 37. Then, the control goes back to the main routine.

Figure 4:
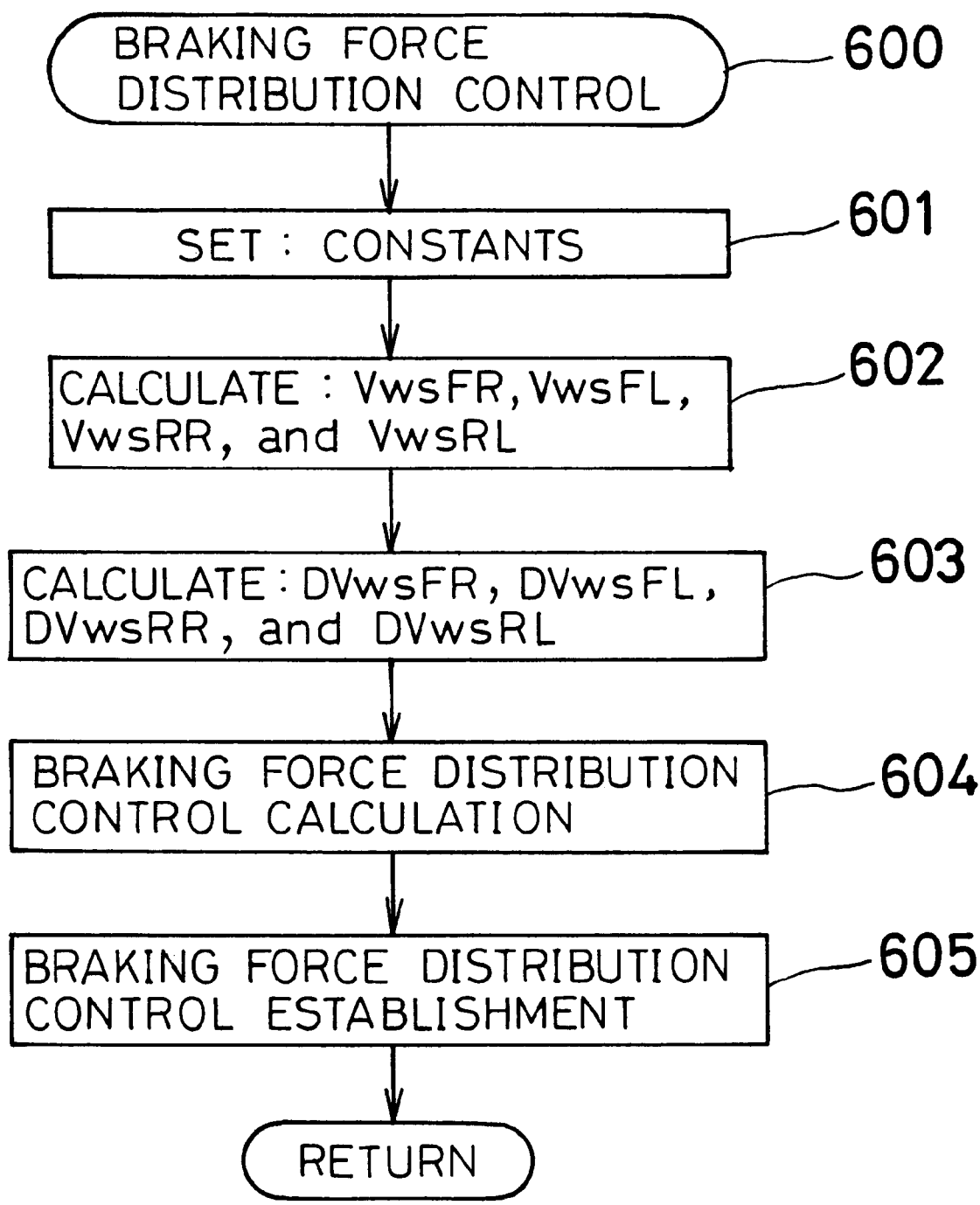
FIG. 4 is a flow chart of the program for braking force distribution control shown in FIG. 3.
Figure 5:
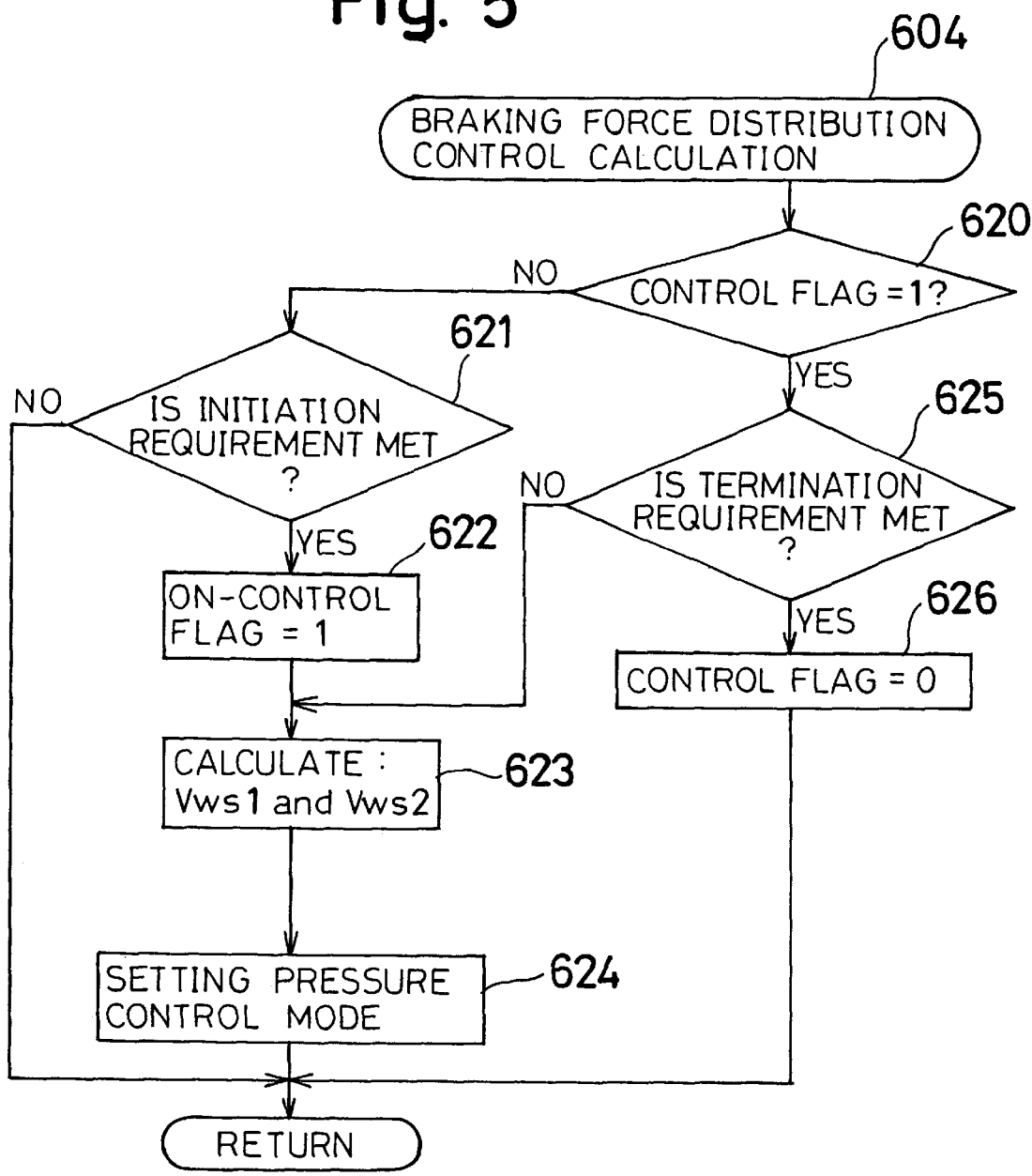
FIG. 5 is a flow chart of the program for braking force distribution control calculation shown in FIG. 4.

FIG. 5 illustrates the braking force distribution control calculation of step 604 in the program shown in FIG. 4. This braking force distribution control calculation is made individually on the rear-right wheel RR and the rear-left wheel RL. First, at step 620, it is determined whether or not the braking force distribution control is on (i.e., if the braking force distribution control flag is 1). If the result is no or an on-control flag is reset, at step 621 it is determined whether or not the braking force distribution control has been requested to be initiated (i.e., whether the initiation requirements have been met). This judgment for initiation will be described later. If the requirement for initiating the braking force distribution control is met, at step 622 the on-control flag is set. Then, at step 623, a first speed threshold value Vws1 and a second speed threshold value Vws2, which is smaller than the first speed threshold value Vws1, are calculated on the basis of the reference speed VwsF* of the front wheel. It is to be noted that at step 623, a first speed threshold value Vws1 and second speed threshold value Vws2 are calculated for the rear-right wheel RR on the basis of the reference speed VwsFR of the front-right wheel FR and another first speed threshold value Vws1 and second speed threshold value Vws2 are calculated for the rear-left wheel RL on the basis of the reference speed VwsFL of the front-left wheel FL. For simplifying such calculations, in the flow chart the reference speed VwsFR of the front-right wheel FR and the reference speed VwsFL of the front-left wheel FL are denoted simply by "the reference speed VwsF* of the front wheel". Thus, hereinafter, the symbol '*' is interpreted to mean both the right and left.

Figure 7:
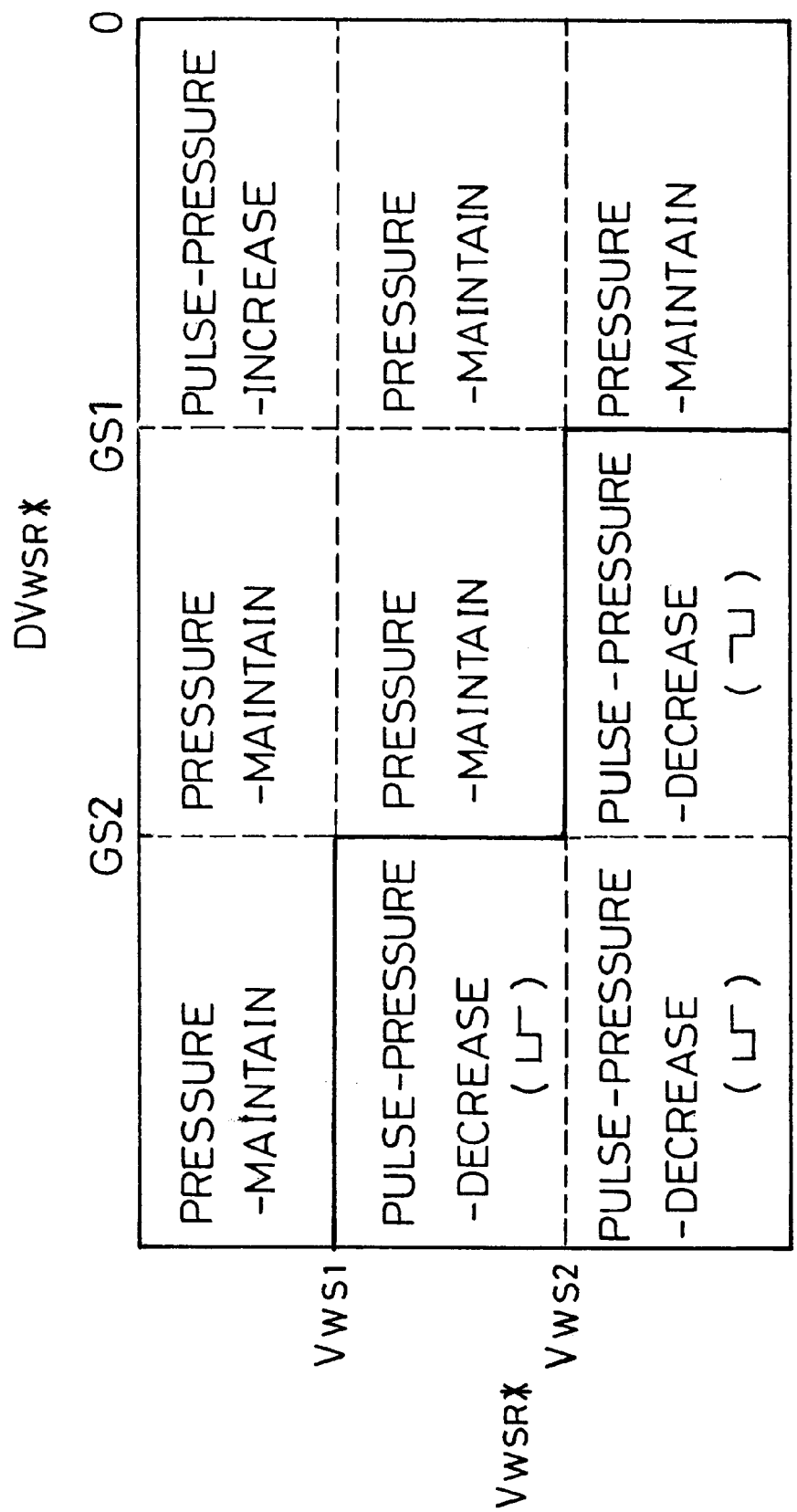
FIG. 7 is a map illustrating hydraulic pressure control modes.

Next, at step 624, pursuant to the map depicted in FIG. 7, a control hydraulic pressure mode is set. More specifically, the reference speed VwsR* of the rear wheel is compared with each of the first speed threshold value Vws1 and the second speed threshold value Vws2 and is also compared with a first acceleration threshold value Gs1 and a second acceleration threshold value Gs2, where Gs1 and Gs2 are constants and Gs2<Gs1<0. Depending on the results of such comparisons, the hydraulic pressure mode is set. For example, if the reference speed VwsR* of the rear wheel is greater than the first speed threshold value Vws1 and the reference acceleration DVwsR* is greater than the first acceleration threshold value Gs1, the hydraulic pressure mode is set to be the pulse pressure-increasing mode.

At step 620, if the on-control flag is found to be set, step 625 is executed to check whether or not a requirement(s) for terminating the braking force distribution control calculation is met. Such a requirement(s) is, for example, that a vehicle acceleration DVso is in excess of a predetermined value of, say, −0.25 G. If the result of step 625 is yes, at step 626, the on-control flag is reset, with the result that the braking force distribution is terminated, whereby the braking operation becomes the normal braking operation. If the requirement(s) for termination is not met, the control goes to step 623 to continue the braking force distribution control.

Next, the initiation requirement of step 621 in FIG. 5 is described with reference to FIG. 6. Initially, at step 630, an estimated vehicle body speed Vso is compared with a predetermined speed Kv. If the result of the comparison indicates that the estimated vehicle body speed Vso is greater than or equal to the predetermined speed Kv, at step 631 the changing rate of a vehicle body acceleration DVso or differentiation value dDVso is compared to a predetermined value K1 (>0). If the result of the comparison at step 631 indicates that the differentiation value dDVso is less than K1, step 632 is executed. If the result of the comparison at step 631 indicates that the differentiation value dDVso is not less than K1, step 633 is executed.

At step 632, a deceleration KD is set to be a first predetermined acceleration KD1 (<0). At step 633 the deceleration KD is set to be a second predetermined acceleration KD2 (<0) which is larger than the first predetermined acceleration KD1 due to the fact that there is a larger tendency of rapid brake operation when the brake pedal is depressed rapidly.

After execution of either of the steps 632 and 633, step 634 is executed to compare the acceleration KD with all the wheel reference accelerations DVwsFR, DVwsFL, DVwsRR, DVwsRL. It is to be noted that instead of the wheel reference accelerations DVwsFR, DVwsFL, DVwsRR, DVwsRL, the wheel accelerations DVwFR, DVwFL, DVwRR, DVwRL calculated at step 104 can be employed.

If none of the wheel reference accelerations DVwsFR, DVwsFL, DVwsRR, DVwsRL is less than the acceleration KD or the reference decelerations of all of the wheels are greater than the acceleration KD, the control goes to step 635 where it is determined if the program is running for the rear-right wheel RR. If the program is running for the rear-right wheel RR, the program proceeds to step 636 at which the wheel reference speed VwsRR of the rear-right wheel RR is compared with a predetermined reference value equal to the reference speed VwsFR of the front-right wheel FR minus a predetermined speed Ks. If the result of the determination in step 636 is yes, which means that the initiation requirement is met, at step 637 the on-control flag is set. If the result of step 636 is no, the initiation requirement has not been established.

If the result of step 635 is no, which means that the program is running for the rear-left wheel RL, the wheel reference speed VwsRL of the rear-left wheel RL is compared with a predetermined reference value equal to the reference speed VwsFL of the front-right wheel FL minus the predetermined speed Ks. If the wheel reference speed VwsRL of the rear-left wheel RL is smaller than the predetermined reference value, the control goes to step 637. Otherwise, it is determined that the initiation requirement has not been established.

In addition, if the estimated vehicle body speed Vso is less than the predetermined speed Kv and one of the wheel reference accelerations DVwsFR, DVwsFL, DVwsRR, DVwsRL is less than the acceleration KD which means that one of the wheel reference decelerations is less than the reference deceleration, the initiation requirement is not established.

As explained above, in the flow chart illustrated in FIG. 6, unlike the known system in which the initiation requirement judgment for the braking force distribution control is delayed, the instant initiation requirement judgment for the braking force distribution control makes it possible to establish a relatively immediate initiation of the braking force distribution control.

In addition, the initiation requirement judgment is made subject to all of the wheel decelerations being in excess of the predetermined deceleration, which ensures the prevention of an unexpected initiation of the braking force distribution control when one of the hydraulic pressure lines P1, P2 fails. Thus, restricting the increasing slope of the hydraulic pressure becomes possible, thereby restricting the lowering of the braking force applied to the wheel. Moreover, while both the acceleration pedal and the brake pedal are depressed concurrently, the wheel accelerations of the respective driving or front wheels FR, FL becomes smaller than the predetermined deceleration, so that braking force distribution control is not initiated.

Furthermore, if the changing rate of the vehicle body deceleration is greater than the predetermined value, the braking operation is judged to be made rapidly, which shifts the initiation threshold value of the braking force distribution control to a much easier side to initiate the braking force distribution control, with the result that upon rapid braking operation the braking force distribution control can be initiated as rapidly as possible.

Figure 6:
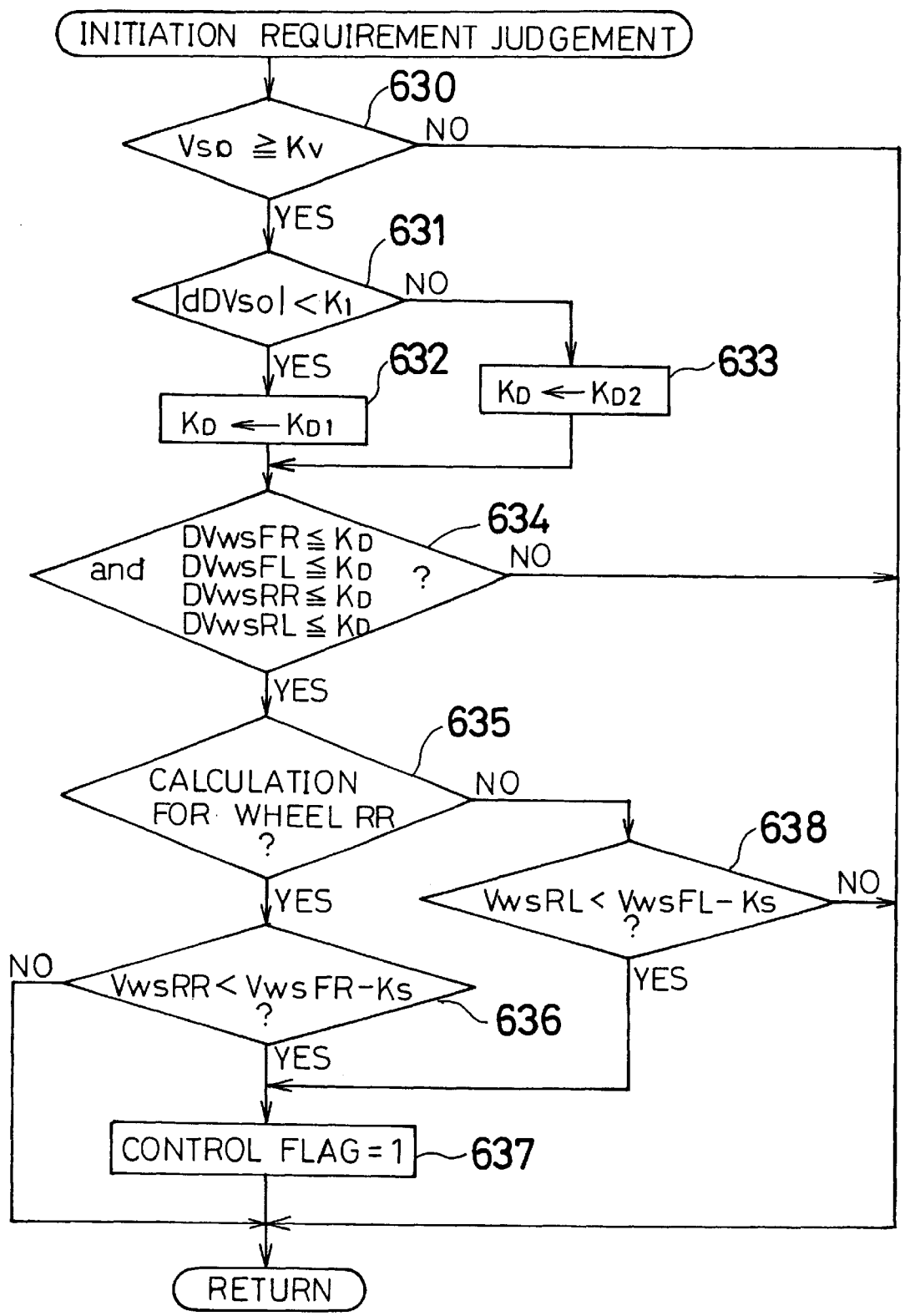
FIG. 6 is a flow chart of the program for initiation condition judgment shown in FIG. 5.

With reference to FIG. 8, there is illustrated a flow chart for the initiation requirement judgment which is an alternative for the flow chart shown in FIG. 6. The flow chart shown in FIG. 8 differs from the flow chart shown in FIG. 6 in that step 634 of the flow chart shown in FIG. 6 is replaced with step 634A shown in FIG. 8. At step 634A, it is determined whether or not one of the wheel reference accelerations, say DVwsFR, of one of the front wheels, say FR connected to the first hydraulic pressure line P1, is not less than the predetermined acceleration KD and whether or not the wheel reference acceleration, say DVwsRR, of one of the rear wheels, say, FR connected to the second hydraulic pressure line P2, is not less than the predetermined acceleration KD. If the result is yes, step 635 is executed. Otherwise, the initiation requirement is not established. Instead of the wheel accelerations (decelerations) of the wheels FR, RR, the wheel accelerations (decelerations) of the wheels FR, FL which are in different hydraulic pressure lines, the wheel accelerations (decelerations) of the wheels RR, RL which are in different hydraulic pressure lines, and the wheel accelerations (decelerations) of the wheels RR, RL which are in different hydraulic pressure lines can be utilized.

It is to be noted that the wheel deceleration of one of the wheels can be used for the initiation requirement judgment in accordance with the present invention, unlike the foregoing method in which plural wheel decelerations of the wheels are used for the initiation requirement judgment.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A braking force distribution control device for an automotive vehicle having a plurality of wheels, comprising:

wheel speed detecting means for detecting a wheel speed of each of the plurality of wheels;

wheel deceleration calculating means for calculating a wheel deceleration of each of the plurality of wheels based on the wheel speeds detected by the wheel speed detecting means; and braking control means for controlling a braking force of a rear wheel to execute a braking force distribution control in such a manner that a braking force of the rear wheel is adjusted to have a predetermined relationship to a braking force of a front wheel depending on a comparison between the wheel speed of the front wheel and the wheel speed of the rear wheel based on the wheel speeds detected by the wheel speed detecting means, the braking control means initiating the braking force distribution control when at least one of the wheel decelerations of the plurality of wheels exceeds a set value.

2. A braking force distribution control device as set forth in claim 1, further including a first wheel cylinder applying a braking force to a first wheel of the plurality of the wheels and connected to a first hydraulic pressure line and a second wheel cylinder applying a braking force to a second wheel of the plurality of the wheels and connected to a second hydraulic pressure line which is disconnected from the first hydraulic pressure line, the braking control means initiating the braking force distribution control when the decelerations of both the first and second wheels exceed the set value.

3. A braking force distribution control device as set forth in claim 1, wherein the braking control means initiates the braking force distribution control when the deceleration of a driving wheel of the plurality of wheels exceeds the set value.

4. A braking force distribution control device as set forth in claim 1, wherein the braking control means initiates the braking force distribution control when the decelerations of all the wheels exceed the set value.

5. A braking force distribution control device as set forth in claim 1, including hydraulic pressure generating means for generating a hydraulic pressure, wheel cylinders mounted on the front an d rear wheels for applying respective braking forces to the front and rear wheels, a hydraulic pressure line connecting the hydraulic pressure generating means and each of the front and rear wheel cylinders, and a hydraulic pressure control valve disposed in each hydraulic pressure line for regulating the hydraulic pressure applied to the corresponding wheel cylinder, the braking control means controlling the hydraulic pressure control valve of the rear wheel for adjusting the hydraulic pressure of the wheel cylinder of the rear wheel to establish a predetermined relationship between the wheel cylinder pressure of the front wheel and the wheel cylinder pressure of the rear wheel.

6. A braking force distribution control device for an automotive vehicle having a plurality of wheels that includes a pair of front wheels and a pair of rear wheels, comprising:

a pressure generator for generating hydraulic pressure;

a plurality of wheel cylinders each mounted on one of the wheels and connected to the pressure generator for applying a braking force to each of the plurality of wheels;

a plurality of wheel speed sensors each operatively associated with one of the wheels for detecting a wheel speed of each wheel;

means for calculating a wheel deceleration of each of the plurality of wheels based on the wheel speeds detected by the wheel speed sensors; and a controller which initiates braking force distribution control when at least one of the wheel decelerations of the plurality of wheels exceeds a set value so that the braking force applied to one rear wheel is adjusted to have a predetermined relationship to a braking force applied to one front wheel depending upon a comparison of the wheel speed of the one front wheel and the wheel speed of the one rear wheel as detected by the wheel speed sensors.

7. A braking force distribution control device as set forth in claim 6, wherein the wheel cylinders include a first wheel cylinder applying a braking force to a first wheel of the plurality of the wheels and connected to a first hydraulic pressure line and a second wheel cylinder applying a braking force to a second wheel of the plurality of the wheels and connected to a second hydraulic pressure line which is separate from the first hydraulic pressure line, the controller initiating the braking force distribution control when the decelerations of both the first and second wheels exceed the set value.

8. A braking force distribution control device as set forth in claim 6, wherein the controller initiates the braking force distribution control when the deceleration of a driving wheel of the plurality of wheels exceeds the set value.

9. A braking force distribution control device as set forth in claim 6, wherein the controller initiates the braking force distribution control when the decelerations of all the wheels exceed the set value.

10. A braking force distribution control device as set forth in claim 6, including a hydraulic pressure line connecting the pressure generator and each of the wheel cylinders, and a hydraulic pressure control valve disposed in each hydraulic pressure line for regulating the hydraulic pressure applied to the respective wheel cylinder, the controller controlling the hydraulic pressure control valve of the rear wheel for adjusting the hydraulic pressure of the wheel cylinder of the rear wheel to establish a predetermined relationship between the wheel cylinder pressure of the front wheel and the wheel cylinder pressure of the rear wheel.

* * * * *